Figure 1:
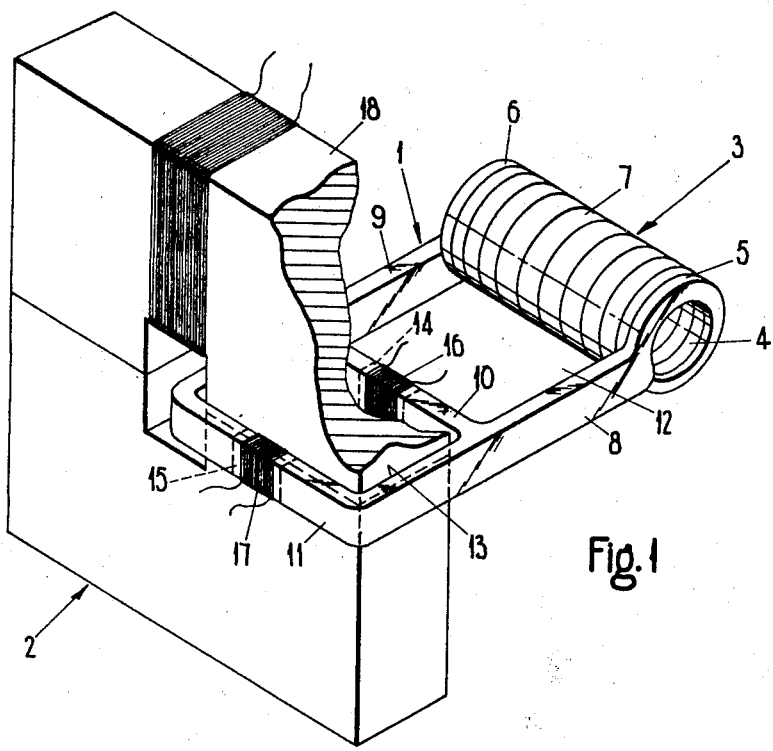

Feb. 18, 1969  M. WILLIAMS  3,427,710
METHOD OF MAKING SUPERCONDUCTING MAGNETS
Filed Dec. 12, 1966  Sheet 1 of 3

INVENTOR
MICHAEL WILLIAMS
BY
ATTORNEYS

Feb. 18, 1969         M. WILLIAMS         3,427,710
METHOD OF MAKING SUPERCONDUCTING MAGNETS
Filed Dec. 12, 1966                    Sheet 2 of 3

INVENTOR
MICHAEL WILLIAMS
BY
ATTORNEYS

Feb. 18, 1969   M. WILLIAMS   3,427,710
METHOD OF MAKING SUPERCONDUCTING MAGNETS
Filed Dec. 12, 1966

INVENTOR
MICHAEL WILLIAMS
BY
ATTORNEYS

United States Patent Office 3,427,710
Patented Feb. 18, 1969

3,427,710
METHOD OF MAKING SUPERCONDUCTING MAGNETS
Michael Williams, Watford, England, assignor to The General Electric Company Limited, London, England, a British Company
Filed Dec. 12, 1966, Ser. No. 600,972
Claims priority, application Great Britain, Dec. 10, 1965, 52,565/65
U.S. Cl. 29—599    15 Claims
Int. Cl. B22f 3/24

This invention relates to superconducting magnets, that is to say to bodies formed of superconductive material maintained below the critical temperature of the material whilst carrying circulating electric currents which set up the magnetic fields by virtue of which the bodies act as magnets, and relates also to methods of magnetisation of such bodies.

Such magnets can produce very high fields and have hitherto usually been made in the form of coils wound from wire of hard-superconductive material such as niobium-zirconium alloy or niobium-tin compound.

There is, however, a difficulty with many such materials of drawing them into wire form, as they are usually brittle and difficult to work, and there are further difficulties in making good electrical and superconducting connections to coils formed of them.

An object of this invention is to provide a method of forming superconducting magnet bodies which is less subject to these difficulties.

According to the invention, a method of making a body of superconductive material suitable for magnetisation to form a superconducting magnet includes the steps of forming from powder a pressed sintered body of superconductive material in the shape of a cylinder bridged by at least one loop and cutting a thread in the cylinder so as to form it into a solenoid whose turns are bridged by each said loop.

The initial powder may be of superconductive material, or it may consist of constituents which react or alloy during the sintering to form superconductive material.

The loop or loops may be formed during the initial pressing of the powder, for example by hydrostatic pressing whilst contained in a rubber mould which is subsequently burnt away or otherwise removed, and the sintering effected thereafter.

Preferably, however, the initial pressing is into the form of a plate continued along an edge by the cylinder, which body is then sintered, and the loop or loops is or are formed by cutting one or more apertures in the plate after the sintering. The plate and/or each aperture can conveniently be rectangular, the sides of the rectangles being parallel.

Where the body includes two or more loops, each of said loops may be provided with a superconducting switch such as a small heater coil, for use in magnetising the body, as will be explained hereafter.

The body may be formed wholly of magnetically hard superconductive material, but where the end-turns of the solenoid are joined by a single loop, it may be convenient in some cases for part of this loop to be of magnetically soft superconductive material for magnetisation purposes, as will be explained hereafter. Such different types of superconductive material can be appropriately positioned in the mould in which the compact to be sintered is shaped and pressed.

Figure 7:
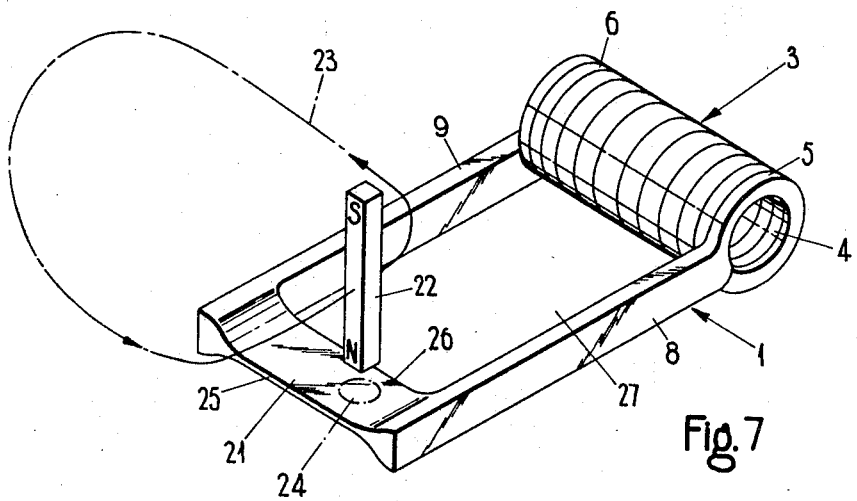
Figure 2:
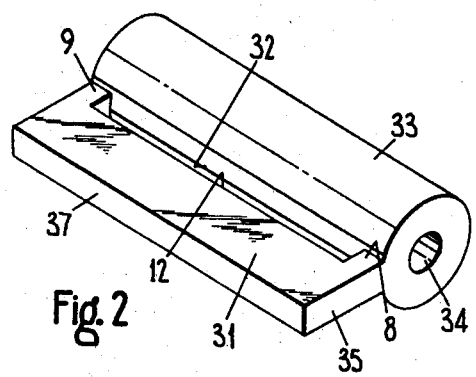
Figure 3:
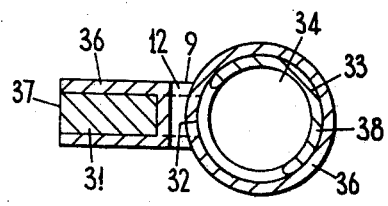
Figure 4:
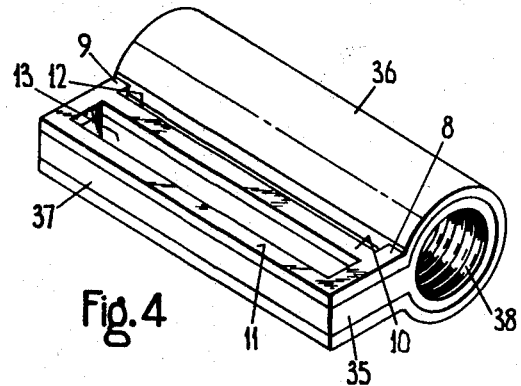
Figure 5:
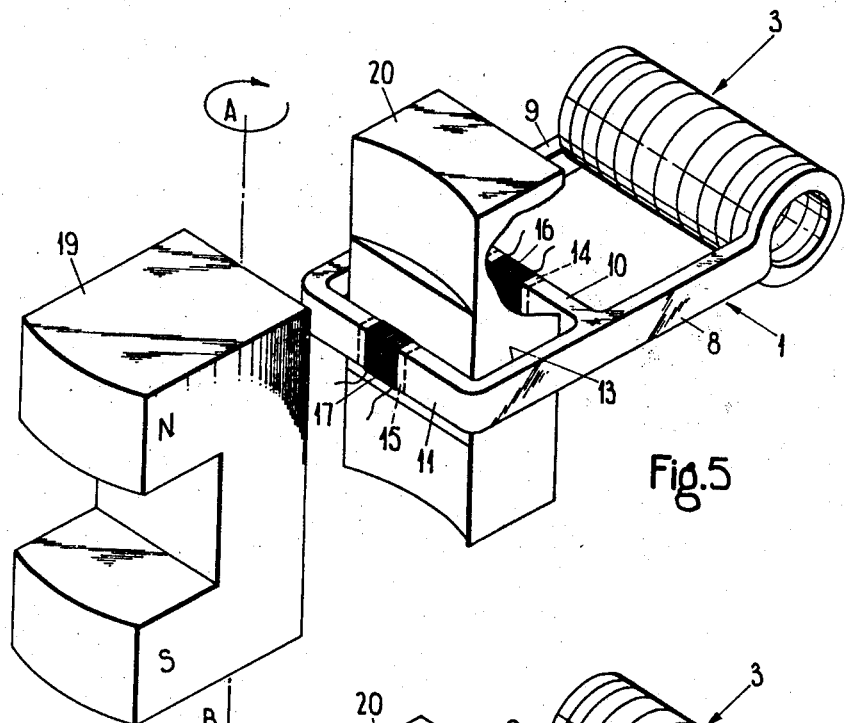
Figure 6:
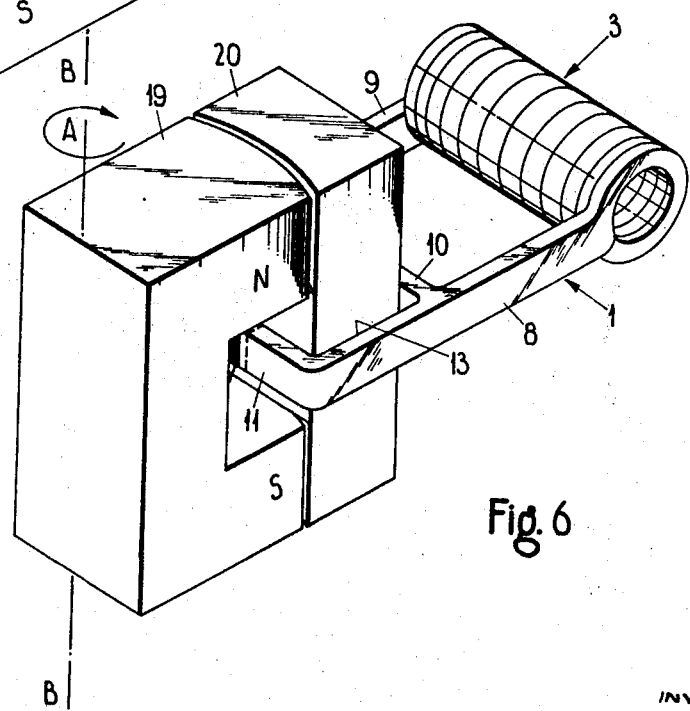

The invention will be further explained in connection with the following description of several arrangements in accordance with it illustrated in the accompanying drawings, in which:

FIGURE 1 is a perspective view of a superconducting magnet body according to the invention and of an electromagnet for magnetisation purposes situated nearby, FIGURES 2 to 4 are schematic illustrations of a niobium-tin compound body at various stages of its formation into a superconducting magnetic body similar to that shown in FIGURE 1, FIGURE 2 is a schematic perspective view of the body at an early stage in its formation, FIGURE 3 is a central sectional elevation of the body shown in FIGURE 2 during mid-course of its formation, FIGURE 4 is a schematic perspective view of the superconductive magnet body construction as finally formed, FIGURE 5 is a perspective view of a superconducting magnet of the same form and of two permanent magnets situated close by for magnetisation purposes, FIGURE 6 is a perspective view of the superconducting magnet body and the two permanent magnets shown in FIGURE 5 but at 180° later in the cycle of magnetisation, and FIGURE 7 is a perspective view of a further superconducting magnet body according to the invention and of a bar magnet used in its magnetisation.

Preferring now to FIGURE 1, the superconducting magnet body 1 in this embodiment is made wholly from sintered niobium-tin, being nominally the compound $Nb_3Sn$, and comprises a solenoid 3 machined from a solid cylinder to form a central hollow core 4 with turns which may be of uniform pitch or may, as indicated, be of smaller pitch (for example about one half) at its ends 5, 6 than at its centre 7. The solid cylinder was initially formed integral with a rectangular plate from which rectangular sections 12 and 13 are cut to leave sintered niobium-tin arms 8, 9 as extensions of the end-turns of the solenoid which arms extend from the solenoid and are linked to one another by lateral bridges 10, 11.

It will be appreciated that the bridges 10, 11 being formed integrally with the arms 8, 9 and the latter being formed integrally with the end-turns 5, 6 of the solenoid, there are good electrical and superconducting connections between these various parts.

Although not shown in FIGURE 1 for clarity of illustration, it is preferred, as in each of the other embodiments illustrated in FIGURES 2 to 7 later to be described, that the exterior of the solenoid 3, of the arms 8, 9 and of the bridge or bridges should be partially or wholly coated with a layer of a good conductor such as copper, the layer being porous if it completely covers the body. Such a coating has the effect of permitting absorption of liquid helium from the cryostat by the porous niobium-tin so as to increase the effective specific heat of the body. The coating also provides a desirable alternative current path of low resistivity in the event of any localised part of the niobium-tin body turning normal. In these two ways coating with a good conductor reduces the probability of the superconducting magnet turning wholly normal in any period in superconducting use. The coating may also serve to strengthen the magnet body against breakage both during and after its formation, as will be explained in connection with FIGURES 2 to 4.

Superconducting switches 14, 15 are provided by heating coils 16, 17 wound round the bridges 10, 11 respectively, these heating coils being thermally insulated on the outside. A switch is said to be open when its bridge is nonsuperconductive and to be closed when its bridge is superconductive. Either switch may be opened by switching on an electric current through the coil 16 or 17 wound round its bridge at the switch. This has the effect of turning a section of the niobium-tin normal in the region of the wire at the switch and will therefore permit flux to be transferred through this normal section during magnetisation of the body. The switches may be closed by switching off the currents through their respective coils.

An electromagnet 2 is shown associated with the loop 13 formed between the bridges 10, 11 and side arms 8, 9. The iron core 18 of electromagnet 2 almost entirely fills the said loop and is split into two half-cores placed with their corresponding interfaces adjacent and is so situated that upon the electromagnet being energised the whole of its magnetic flux will link with the said loop.

The use of the electromagnet for magnetising the solenoid will later be described, but the formation of the magnet body 1, and similar magnet bodies for use in accordance with the invention, will first be described in more detail with reference to FIGURES 2 to 4.

For forming the initial basic shape of the magnet body, powdered niobium and powdered tin in proportions with an excess of niobium over the proportions which would occur in the intermetallic compound $Nb_3Sn$ (preferably in the atomic proportions of 80% niobium to 20% tin) are pressed into a mass having the general shape of a solid cylinder affixed to a rectangular plate. The body so formed is sintered at about 975° C. for two hours to form niobium-tin compound $Nb_3Sn$.

A pilot cylindrical channel of only a moderate diameter and of which one aperture 34 is shown in FIGURE 2 is then by careful boring driven coaxially throughout the length of the solid cylinder portion 33 of this niobium-tin compound $Nb_3Sn$ body. A rectangular slot 12 is then cut from the plate portion of the body using the technique of spark-erosion, care being taken in this to ensure that the side 32 of this slot closest to the cylindrical portion 33 forms an accurate continuation of the outer surface of the cylinder. This leaves a body of niobium-tin compound at the stage shown in FIGURE 2 in which the cylindrical portion 33 is attached to the remaining plate portion.

The apertures at the end of the pilot channel bored are next temporarily plugged and by using the body as a cathode in a copper sulphate solution electroplating bath, a thick external coating of copper is then deposited upon its exterior to provide a strong outer casing 36 of copper. The initial function of this casing is to give mechanical support to the body during its subsequent fabrication and thereby reduce the possibility of breakage of the extremely brittle niobium-tin compound of which it is formed.

The stoppers are then removed from the apertures and the copper casing 36 machined externally to a uniform thickness and smooth finish. The coating formed over each of the two lateral faces such as 35 in FIGURE 2, and the coating formed over the rectangular end surfaces 37 in FIGURE 2 furthest removed from the cylindrical portion 33 of the body, are then machined away to expose the niobium-tin compound $Nb_3Sn$.

The axial cylindrical channel through the cylindrical portion 33 of the now strengthened body is then rebored to susbtantially increase its diameter, and starting from a first aperture at one end of the channel a first tapered tap is tapped half-way along the length of the channel, the tap being periodically removed and reinserted for freeing the dust of niobium-tin compound $Nb_3Sn$ formed in the course of the tapping (which might otherwise clog the teeth of the tap and cause splitting of the brittle niobium-tin compound body). The tap is then introduced into the aperture at the opposite end of the channel and likewise tapped half-way along the length of the channel from this end so as to meet the other tapping at the centre and thereby to provide a continuous uniform shallow thread 38 in the walls of the channel hollowed out from the cylindrical portion of the body. This thread is then deepened by retapping using a second tapered tap in the same way. The extent of this deepening is such that in this second tapping the thread is tapped right through the niobium-tin compound $Nb_3Sn$ walls and bites into the copper sufficiently to ensure that each of the turns of the niobium-tin compound solenoid which is so formed is distinct from its adjacent turns. This leaves a straight solenoid of niobium-tin compound encased in a tubular casing of copper, the solenoid end-turns being in effect attached by short arms 8, 9 to the plate portion 31 remaining on the other side of the rectangular slot 12. FIGURE 3 shows the body in central sectional elevation at this stage in its formation. A further rectangular slot 13 parallel to slot 12 is then cut by spark erosion from the portion of the plate 31 remaining to provide bridges 10, 11 as illustrated in FIGURE 4 which shows a perspective view of the body so formed as it would appear at this stage. The copper coating 35 of the exterior of the various parts of this finished body apart from its original strengthening purposes serves to stabilise the magnet against turning wholly normal in subsequent superconductive use.

A small heating coil of suitable resistance wire is then wound round the bridge 10 and another around the bridge 11, these coils being electrically insulated from their respective bridges and thermally insulated on the outside.

A method of manufacture of a superconducting magnet body having a solenoid the turns of which are of a variable pitch, such as that shown in FIGURE 1 is substantially the same as the above except that the step of tapping a thread through the enlarged central channel is replaced by a spark erosion technique using one rotating electrode within the channel and an opposed similarly rotating electrode on the outside of the cylindrical portion of the magnet body, which body is fed between the electrodes at the variable rate required for producing the variable pitch turns, the rate or rotation of the electrodes being suitably related to the rate of feeding between them of the body for obtaining the required depth of arc erosion cut for forming the solenoid turns.

For magnetisation, the whole superconducting magnet body and the electromagnet 2 are placed in a cryostat and cooled to a temperature substantially below the critical temperature of niobium-tin compound, for example by immersion in liquid helium. A current is switched on through the coil 17 so as to open the superconducting switch 15. The electromagnet 2 is then switched on so that flux lines permeate the loop 13. The current is then switched off through the coil 16 so that the superconducting switch 15 closes and a flux is left trapped in the loop 13. The current through the coil of the electromagnet 2 is then slowly reduced, whereon a circulating current is set up in the superconducting circuit comprising the bridges 10, 11 and the portions of the arms 8, 9 between them. A current is then switched on through the coil 16 so as to open the superconducting switch 14. A fraction of the flux trapped in the loop 13 is thus caused to be transferred through the normal section so created in the niobium-tin superconductor in the region of the coil 16 into the loop 12, so causing current to flow through the solenoid 3. The current through the coil 16 is then switched off so as to close the superconducting switch 14. The flux transferred into the gap 12 is thus trapped and the current flowing through the solenoid 3 and the arms 8, 9 becomes distributed between the bridges 10, 11.

This cycle of events is repeated as many times as are required to build up a suitably high current density in the solenoid.

FIGURES 5 and 6 are perspective views of a superconducting magnet body 1 of the same kind as shown in and described for FIGURE 1 but are intended to illustrate a different means of magnetisation, using a horseshoe type permanent magnet rather than an electromagnet. In FIGURES 5, 6 such a permanent magnet 19 is shown, as is also a magnetic shunt 20 of soft iron placed so as to link the loop 13 of the superconducting magnet body 1.

In magnetisation of the solenoid 3, the whole apparatus is placed in a cryostat and cooled to below the critical temperature of niobium-tin compound. The permanent magnet 19 is then rotated, as indicated, about the axis A–B and the superconducting switches 14, 15 are opened and closed in the following sequence:

With the horseshoe magnet 19 in the position shown in FIGURE 5 and with hardly any flux from its poles linking the magnetic shunt 20 the superconducting switch 15 is opened by switching on the current through the coil 17. When the horseshoe magnet 19 has rotated to the position in which it is shown in FIGURE 6 and with most of the flux from its poles linking the shunt 20 the superconducting switch 15 is closed by switching off the current through the coil 17. This causes the flux linking the shunt 20 at that instant in the rotation to be trapped within the loop formed by the bridges 10, 11 and the portions of the arms 8, 9 between them and as the magnet 19 continues to rotate from the position shown in FIGURE 3 to that shown in FIGURE 5 circulating currents are set up in this latter superconducting loop to compensate for the decrease in external flux linkage as the poles of the magnet 19 move further from the shunt 20.

Shortly before the magnet 19 has rotated back to the position shown in FIGURE 5, however, the superconducting switch 14 is opened and closed by switching on and off a current through the coil 16 so that a fraction of the flux previously trapped in the loop 13 is transferred through the superconducting switch 14 and into the loop comprising the solenoid 3, the bridge 10 and the portions of the arms 8, 9 between these parts. A circulating current is thus set up in this latter loop and through the solenoid 3.

The cycle of events is repeated each time the horseshoe magnet 19 is rotated and it is rotated as many times as are required to build up a large enough current through the solenoid 3. The permanent magnet must be of a material able to resist the tendency of the induced current to demagnetise it, for the working range of current envisaged.

FIGURE 7 shows a further embodiment of the invention in which the superconducting magnet body differs from that of FIGURE 1 or FIGURES 5 and 6 in having only a single bridge 21, which is of soft superconductive material (not provided with a superconducting switch) instead of the two bridges 10, 11.

In manufacture of the magnet body mixed niobium and tin powders are as before pressed into the shape of a solid cylinder affixed to a rectangular plate, but the end part of the mould, which defines the free end of the plate, is filled with powdered niobium alone for forming a pure niobium extension of the plate at the free end, i.e., the end furthest from the cylinder. The whole body so formed is then heated for about two hours at 975° C. to sinter the body to solid coherent form. Boring out the cylinder followed by variable machining of the tube so left to form the solenoid 3 is then carried out. The centre is then cut out of the plate in such a way as to leave arms 8, 9 of sintered niobium-tin as extensions of the lead-in and lead-out turns of the solenoid 3 also of niobium-tin and a single lateral bridge 21 of pure niobium soft-superconductive material. This niobium bridge 21 is then bevelled down from its ends using a suitable tool so as to produce a central region thin enough to be pierced by lines of flux from the pole of a bar magnet placed adjacent to it.

Alternatively after pressing and sintering as described followed by boring and machining of the cylinder to form the solenoid 3, the plate may be cut away to leave nothing but two sintered arms 8, 9 as extensions of the lead-in and lead-out turns of the solenoid 3. These arms 8, 9 so formed will be of sintered $Nb_3Sn$ for most of their length but at their ends will be of sintered pure niobium. A thin sheet of pure niobium may then conveniently be welded between the niobium ends of these arms 8, 9 to form the bridge 21.

In a modification of this latter construction, the plate part of the initial compact is formed from powdered niobium only at the sides of the free end region so as to provide niobium weld-seatings for the niobium plate bridge 21 after cutting of the plate to produce the arms 8, 9.

For magnetisation, the whole superconducting magnet body and a bar magnet 22 shown situated near the bridge 21 are placed in a cryostat and cooled to below the critical temperatures of both the niobium-tin compound and of metallic niobium. The bar magnet is then caused by suitable means to execute a traverse as indicated by the line 23 shown in part in full and in part dotted.

In the first part of this traverse one pole of the bar magnet is drawn from the outside across the bridge 21 so that flux lines, either by sheer strength of magnetic field or with the aid of an auxiliary radiation spot (not shown) arranged to travel with the pole in this part of the traverse, turn a section 24 of the soft superconductor normal and pierce the bridge. This normal section 24 travels with the said pole of the bar magnet 22 from the face 25 of the superconducting bridge 21 furthest from to the face 26 nearest to the solenoid 3 and in this way effects the introduction of flux lines into the gap 27.

The traverse is then continued, the pole being removed from the superconducting magnet 1 in such manner as not to cause flux jumping across one of the hard-superconductor arms 9, for example across one of the side arms slowly and in an upwardly swept arc as shown dotted externally of the superconducting magnet 1 back to its initial position.

In slowly being drawn across the hard-superconductor arm 9 and at a distance, flux lines from the pole do not turn a section normal in the arm and therefore do not penetrate the arm. There is therefore no transference of magnetic flux stored in the gap 27 to the outside. The whole cyclic traverse of the magnetic pole therefore results in an increase in magnetic flux stored in the gap 27, and in the creation of a corresponding current in the loop comprising the solenoid 3, the arms 8 and 9, and the bridge 21 as one attempts to withdraw the flux from the closed superconducting circuit.

Repeated traverses of the pole of the bar magnet are made as many times as are required to build up a sufficient current in the solenoid.

It is an advantage of the invention that any of the embodiments described may readily be demagnetised by reversing the magnetisation process.

In the first and second embodiments shown in FIGURE 1 and FIGURES 5, 6 respectively this involves switching on and off in reverse and in the reverse order to that described for magnetisation. In the first embodiment, the magnetic energy is dissipated in a load connected across the electromagnet winding. In the case of the second embodiment demagnetisation is accomplished by rotating the pole-reversed horseshoe magnet 19 with appropriate timing of the switches 15 and 16 to produce an outward feed of the magnetic flux, the magnetic energy being dissipated by the mechanical work required to rotate the magnet.

In the third embodiment shown in FIGURE 7, demagnetisation may be performed either by performing cyclic traverses of the magnetic pole as described, but in the reverse sense, or alternatively by carrying out the process described for magnetisation but with the bar magnet reversed end for end, the magnetic energy in either case being dissipated by the mechanical work involved in moving the bar magnet.

I claim:

1. A method of making a body of superconductive material suitable for magnetisation to form a superconducting magnet, said method comprising the step of forming from powder a pressed sintered superconductive material body in the shape of a cylinder bridged along its length by at least one loop and cutting a thread in the cylinder so as to form it into a solenoid whose turns are bridged by each said loop.

2. A method of making a superconductive body according to claim 1, wherein the powder is initially pressed into the form of a plate portion joined along an edge to the cylinder, which body is then sintered, and a number of the loops are formed by cutting a number of apertures in the plate portion after the sintering.

3. A method of making a superconductive body according to claim 2, wherein said plate is rectangular and each of said apertures is rectangular with sides parallel to those of the plate.

4. A method of making a superconductive body according to claim 2, wherein the material of which the free end of the plate is formed consists of magnetically soft superconductive material whilst the rest of the body consists of magnetically hard superconductive material and a single aperture is formed in the plate so as to provide in the completed body a solenoid bridged by a single loop consisting in part of the soft superconductive material.

5. A method of making a superconductive body according to claim 2, wherein the plate part of the completed body forms two apertures providing two lateral bridges linking side arms continuing the end turns of the solenoid.

6. A method of making a superconductive body according to claim 1, wherein the body is provided with a coating of metal of good electrical conductivity which permits access of liquid helium to the body when the body is immersed in liquid helium.

7. A method of making a superconductive body according to claim 6, wherein the metal coating is applied to the body before the cutting of the cylinder and provides a mechanical support therefor during the cutting which reduces the risk of breakage of the body.

8. A method of making a superconductive body according to claim 7 in which the superconductive material consists substantially of the niobium-tin compound $Nb_3Sn$.

9. A method of making a superconductive body according to claim 8, in which the powdered niobium and tin constituents of the compound are mixed and pressed to the shape of the mass to be sintered so that the niobium-tin compound is formed as a result of the sintering.

10. A method of making a superconductive body according to claim 7, wherein the cutting of the cylinder includes the steps of boring a coaxial hole through the cylinder and internally tapping the hole to form the solenoid.

11. A method of making a superconductive body according to claim 7, wherein the cylinder is cut so as to form a solenoid in which the pitch of the turns at each end is less than that at the centre.

12. A method of making a superconductive body according to claim 1, wherein the cutting of the cylinder includes the steps of boring a coaxial hole through the cylinder and internally tapping the hole to form the solenoid turns.

13. A method of making a superconductive body according to claim 1, wherein the cylinder is cut so as to form a solenoid in which the pitch of the turns at each end is less than that at the centre.

14. A method of making a superconductive body according to claim 1, wherein the material of which the free end of the plate is formed consists of magnetically soft superconductive material whilst the rest of the body consists of magnetically hard superconductive material and a single aperture is formed in the plate so as to provide in the completed body a solenoid bridged by a single loop consisting in part of the soft superconductive material.

15. A method of making a superconductive body according to claim 1, wherein the plate part of the completed body forms two apertures providing two lateral bridges linking side arms continuing the end turns of the solenoid.

References Cited
UNITED STATES PATENTS

| | | | |
|---|---|---|---|
| 3,218,693 | 11/1965 | Allen et al. | 29—599 |
| 3,296,684 | 1/1967 | Allen et al. | 29—599 |
| 3,325,888 | 6/1967 | Weinig et al. | 29—420 |

JOHN F. CAMPBELL, *Primary Examiner.*

P. M. COHEN, *Assistant Examiner.*

U.S. Cl. X.R.

29—420.5